UNITED STATES PATENT OFFICE.

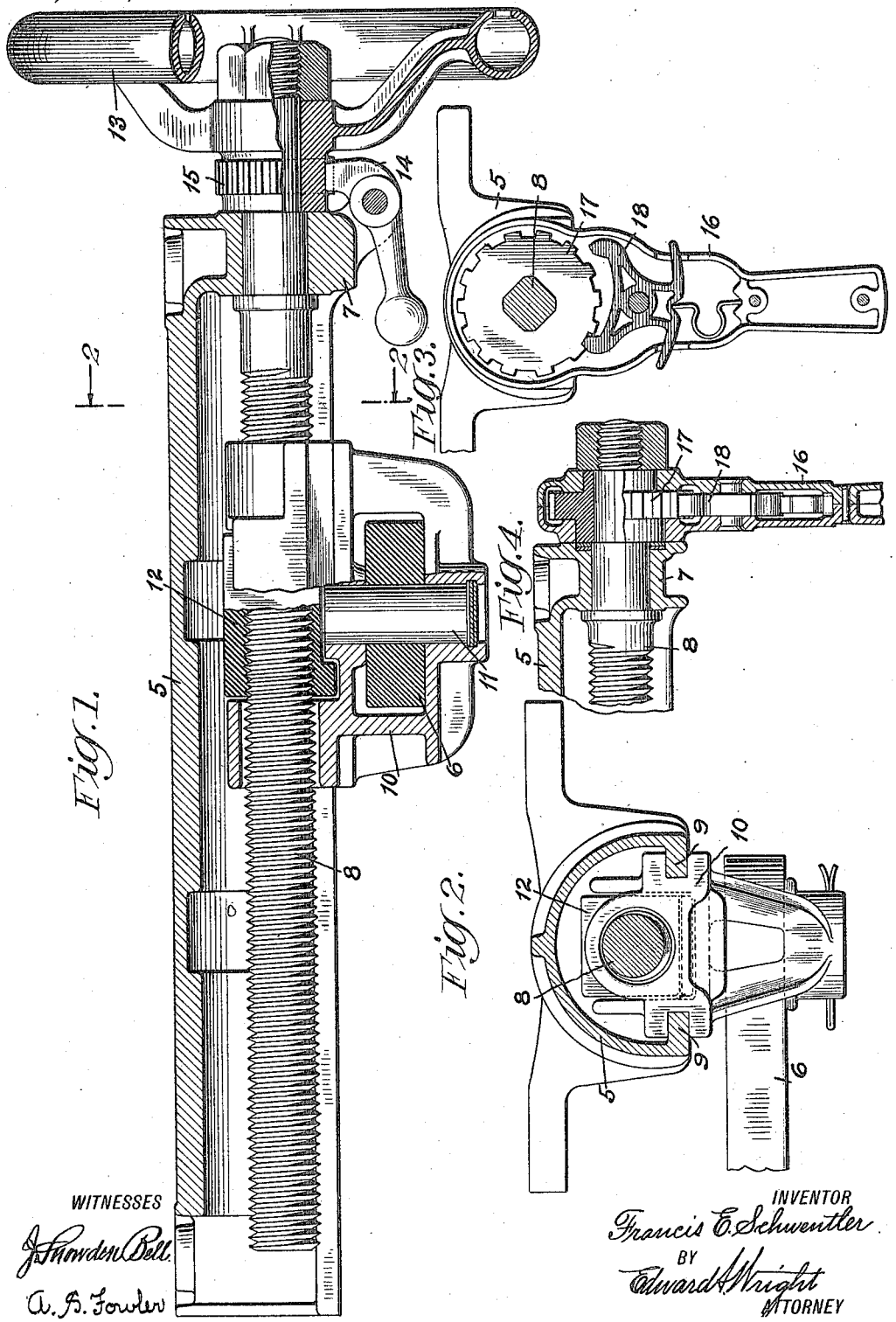

FRANCIS E. SCHWENTLER, OF ST. LOUIS, MISSOURI, ASSIGNOR TO AMERICAN BRAKE COMPANY, OF ST. LOUIS, MISSOURI, A CORPORATION OF MISSOURI.

BRAKE-SLACK ADJUSTER.

1,184,882.　　Specification of Letters Patent.　　Patented May 30, 1916.

Application filed September 16, 1914. Serial No. 861,968.

*To all whom it may concern:*

Be it known that I, FRANCIS E. SCHWENTLER, a citizen of the United States, and a resident of St. Louis, in the State of Missouri, have invented a certain new and useful Improvement in Brake-Slack Adjusters, of which improvement the following is a specification.

This invention relates to mechanism for taking up the slack in the brake rigging of railway cars, due to the wear of the brake shoes and other parts, and has for its object to provide an improved device of this character which may be readily applied to usual forms of brake rigging and adapted to be manually adjusted.

In the operation of the air brake it is important that the length of travel of the piston in the brake cylinder should be maintained substantially constant in order that the brakes may operate efficiently, and as the wearing down of the brake shoes tends to increase the brake piston travel it has been the custom to provide a series of holes for the fulcrum pin of the dead truck lever and to adjust the pin from one hole to another to compensate for the wear of the brake shoes.

According to my invention an improved screw device is provided for adjusting the fulcrum of any suitable lever of the brake rigging, preferably the intermediate horizontal lever of the rigging beneath the car, as ordinarily employed in freight service.

In the accompanying drawing: Figure 1 is a longitudinal section of a slack adjusting device embodying my improvement; Fig. 2, a transverse section taken on the line 2—2 of Fig. 1; and Figs. 3 and 4, a transverse section and a longitudinal section respectively, showing a double acting ratchet lever in lieu of the hand wheel for operating the screw.

As shown in Figs. 1 and 2 of the drawing, my improved device comprises a frame or casing, 5, adapted to be rigidly bolted or otherwise fastened to the car frame and above the fulcrum of the brake lever, 6, which is to be adjusted. The casing is preferably of a hollow arched form, having a depending wall, 7, at one end in which the screw, 8, is rotatably mounted, and longitudinal guide flanges, 9, on which is slidably mounted the fulcrum block, 10, having fulcrum pin, 11, for the brake lever, 6.

The block is formed with a recess, preferably rectangular, in which is loosely mounted the nut, 12, on the screw, 8, which passes loosely through openings in the front and rear portions of the fulcrum block upon the opposite sides of the nut, 12. The fulcrum pin, 11, is preferably supported on the block beneath the center of the nut, 12.

For the purpose of operating the screw, a hand wheel, 13, may be rigidly mounted on the end thereof outside of the casing and bearing against the outside wall, 7, a weighted pawl, 14, and ratchet, 15, being provided to normally prevent the vibrations of the car, disturbing the adjustment of the screw.

As the brake piston travel increases, due to the wear of the brake shoes, the slack may be adjusted from time to time, by manually turning the screw in the proper direction the desired number of notches, thereby sliding the fulcrum block along its guides and moving the fulcrum of the brake lever a sufficient distance to compensate for the slack and restore the normal travel of the brake piston. When the brake shoes are worn to such an extent as to require renewals, the pawl may be raised and the screw may then be turned backward a sufficient distance to permit the removal of the worn shoe and the insertion of a new one. If it be desired to remove the fulcrum block from the casing for any purpose, this may readily be done by turning the screw until the nut travels off the end of the same, whereupon the block may then slide off the end of the guide flanges of the casing.

If there should not be sufficient space beneath the car frame to easily operate the hand wheel, or if it be desired to operate the screw manually from a lower point, a double acting lever, 16, and ratchet, 17, may be mounted on the end of the screw in lieu of the hand wheel, as shown in Figs. 3 and 4, of the drawing. The operation in this case is substantially the same except that the screw is turned by the oscillatory movements of the lever, the reversible pawl, 18, being adjustable to turn the screw in either direction.

It will now the apparent that I have provided a simple and durable construction which may be readily applied to the ordinary existing designs of brake rigging as used on freight cars or other rolling stock, and that the screw is substantially covered by the casing so as to be protected from injury, and the accumulation of dirt or other foreign matter.

Having now described my invention, what I claim as new and desire to secure by Letters Patent is:

1. In a brake slack adjuster, the combination of a casing, a screw rotatably mounted therein at one end and being free at its other end, a fulcrum block slidably supported on said casing and operated by said screw, a brake lever pivoted on said fulcrum block, and means for manually adjusting said screw.

2. In a brake slack adjuster, the combination of a casing open at one end, a screw rotatably mounted therein at the other end and having its end free, a fulcrum block, a brake lever pivoted thereon, a nut on said screw for shifting the fulcrum block, and means for manually turning said screw.

3. In a brake slack adjuster, the combination of a casing having guide flanges and open at one end, a screw rotatably mounted in the other end of said casing, a fulcrum block slidably mounted in said guides, a brake lever pivoted on said block, a nut on said screw and engaging said block, and means for manually turning said screw.

4. In a brake slack adjuster, the combination of a casing, a screw rotatably mounted therein at one end and having its other end free, a fulcrum block slidably supported on said casing and having a recess, a nut mounted on said screw within said recess, a brake lever pivoted on said block, and means for manually turning said screw.

5. In a brake slack adjuster, the combination of a casing, a screw rotatably mounted therein at one end and being free at its other end, a fulcrum block slidably supported on said casing, a nut on said screw and engaging said fulcrum block, a brake lever pivoted on said block at a point beneath the center of said nut, and manually operated means for turning said screw.

FRANCIS E. SCHWENTLER.

Witnesses:
ALEX. STEINER,
OTTO J. PAPKE.

Copies of this patent may be obtained for five cents each, by addressing the "Commissioner of Patents, Washington, D. C."